UNITED STATES PATENT OFFICE.

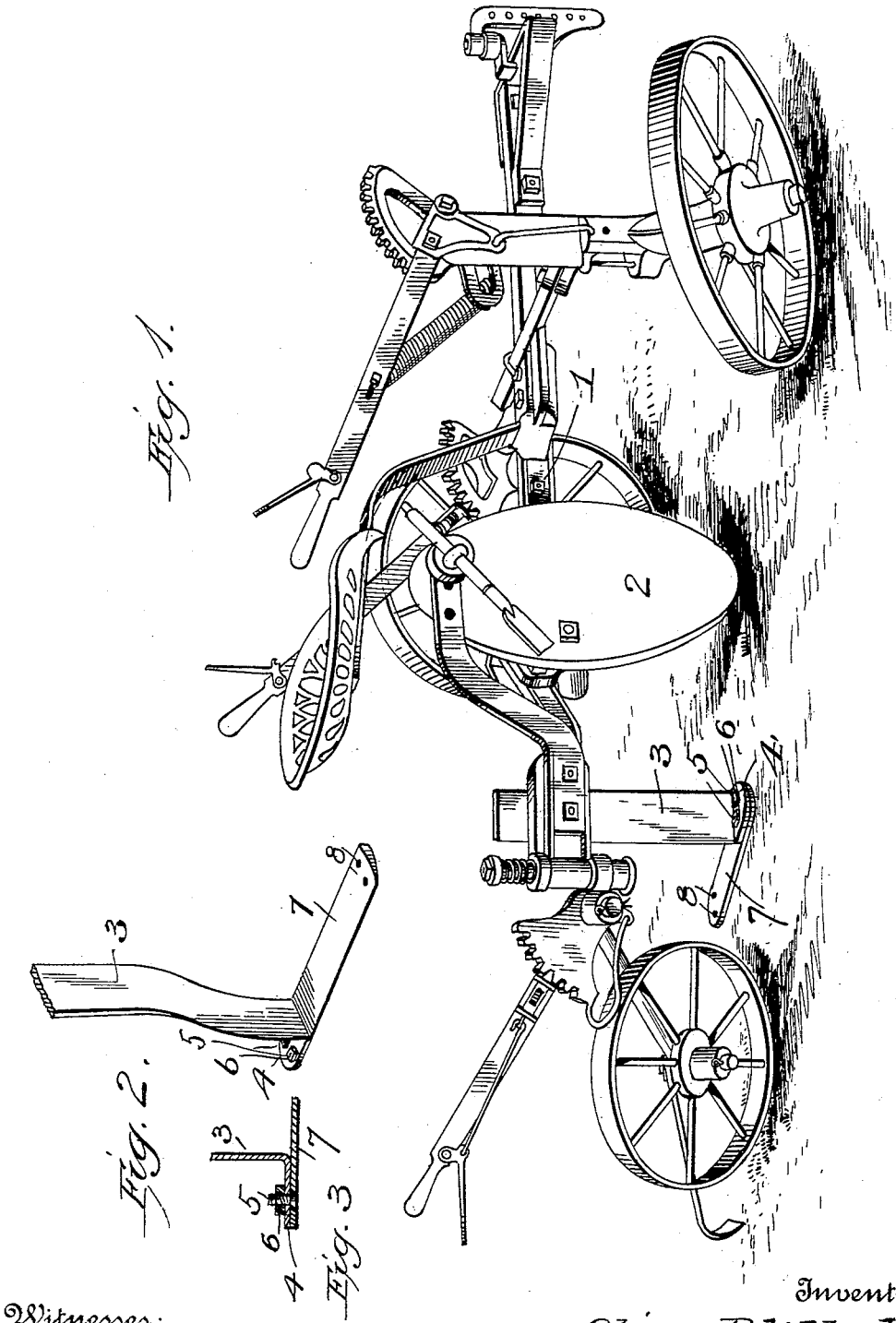

OLIVER P. WOLCOTT, OF OAK CLIFF, TEXAS.

DISK PLOW.

SPECIFICATION forming part of Letters Patent No. 618,261, dated January 24, 1899.

Application filed July 22, 1898. Serial No. 686,610. (No model.)

*To all whom it may concern:*

Be it known that I, OLIVER P. WOLCOTT, a citizen of the United States, residing at Oak Cliff, in the county of Dallas and State of Texas, have invented new and useful Improvements in Disk Plows, of which the following is a specification.

My invention relates to rotary disk plows, and is intended as an improvement upon the invention disclosed in the Letters Patent granted to me December 28, 1897, No. 596,390. The invention set forth in said patent consisted, essentially, in a concavo-convex disk forming a furrow cutter and turner located at an angle to the line of draft of the plow, in combination with a horizontal cutter located in front of said disk and traveling parallel with the line of draft and adapted to undercut the soil in advance of the disk. This construction is objectionable in that trash, dirt, and other material are liable to accumulate in and choke the space between the cutter and disk and thus interfere with the proper working of the plow.

The object of the present invention is to obviate the above objection and provide a plow which shall possess superior advantages with respect to efficiency in use, and also to provide and improved construction of cutter which when the under side becomes worn, forming a beveled or round cutting edge, so that its tendency will be to ride over the soil instead of undercutting the same, can be reversed, so as to properly take into the ground.

The invention consists in the novel construction and combination of parts hereinafter fully described and claimed.

In the accompanying drawings, Figure 1 is a perspective view of a rotary plow constructed in accordance with my invention. Fig 2 is a similar view of the cutter detached. Fig. 3 is a detail sectional view of the cutter.

In the said drawings I have shown a rotary plow of that class or description which comprises in its structure a horizontal axle and vertical wheel, an inclined axle and inclined wheel, a steering or caster wheel, means for adjusting the same, and other accessorial parts such as are in ordinary use and which form no part of the present invention. I shall therefore describe only such parts as are necessary to illustrate my invention.

Referring now to the said drawings, the reference-numeral 1 designates the plow-beam, with which is connected a revolving concavo-convex disk 2, which forms the furrow cutter and turner and which is set at an angle to the line of draft of the plow. Located in rear of said disk and adjustably secured to the said beam is a standard 3, the lower end of which is turned outwardly at a right angle, forming a flange 4, provided with two bolt-holes. Secured to this flange by bolts 5 and nuts 6 is an inwardly-extending and rearwardly-inclined reversible cutter 7, formed with bolt-holes 8 at each end. It will be seen that the cutter is located opposite the convex side of the disk instead of the concave surface thereof, as in my said patent before referred to, and also extends in a direction away from the furrow turned by the disk. It travels in a line parallel with the line of draft of the plow and does not follow in the furrow turned by the disk, but in a line parallel thereto. It will also be noticed that the bolts and nuts being outside of the line of cut made by the cutter will not come in contact with the undercut soil.

The operation is as follows: As the plow is drawn over a field the disk will cut and turn the furrow, as usual, while the cutter, traveling in rear of the disk, will undercut the soil in a line at one side of and parallel to said furrow, so that upon the next round of the plow the disk will engage with said undercut portion, which will render the operation of turning the furrow easier, while the cutter will make a new undercut for the next round of the plow, and so on until the field is plowed. The cutter will also hold the disk to its work and there will be no liability of choking.

In hard or sandy soil the under side of the cutter will become worn by use, so as to give a bevel to the under side of the cutting edge, the tendency of which is to cause the cutter to ride over the soil instead of undercutting it. To obviate this, I remove the bolts, reverse the cutter, so as to bring the upper side down, and then secure the opposite end to the flange of the standard, so that what was before the outer end is now the inner end and what was the upper side is now the under side. By this means the cutter can always be made to properly perform its work, as it can be successively reversed as the under side of the cutting edge becomes beveled or rounded by wear.

While I have shown and described my invention as applied to a single disk plow, it is obvious that it may be used in connection with a double-disk or gang plow without departing from the principle of my invention.

Having thus fully described my invention, what I claim is—

1. In a rotary plow, the combination with the furrow cutter and turner consisting of the rotatable concavo-convex disk located at an angle to the line of draft, of the vertical standard located in rear of said disk and the reversible horizontal cutter secured thereto and extending in a direction away from the convex surface of the disk.

2. In a rotary plow, the combination with the beam and the furrow cutter and turner consisting of the rotatable concavo-convex disk, of the standard secured to said beam and located in rear of said disk and having its lower end bent outwardly at a right angle forming a flange provided with bolt-holes, the reversible inwardly-extending and rearwardly-inclined horizontal cutter formed with bolt-holes at each end, and the bolts and nuts, substantially as described.

In testimony whereof I have hereunto set my hand in presence of two subscribing witnesses.

OLIVER P. WOLCOTT.

Witnesses:
G. D. LAUCERDALE,
E. A. STALKER.